United States Patent [19]

McSwiggin

[11] 3,769,031

[45] Oct. 30, 1973

[54] LIGHT-MILLED ROAST AND GROUND COFFEE

[75] Inventor: Joseph R. McSwiggin, Cincinnati, Ohio

[73] Assignee: The Procter & Gamble Company, Cincinnati, Ohio

[22] Filed: Feb. 17, 1972

[21] Appl. No.: 227,245

Related U.S. Application Data

[63] Continuation-in-part of Ser. No. 66,074, Aug. 21, 1970, abandoned.

[52] U.S. Cl. .................... 426/148, 99/66, 99/68
[51] Int. Cl. ............................................. A23f 1/04
[58] Field of Search ........................... 99/65, 68, 66

[56] References Cited
UNITED STATES PATENTS

| | | | |
|---|---|---|---|
| 3,660,106 | 5/1972 | McSwiggin et al. | 99/65 |
| 3,615,667 | 10/1971 | Joffe | 99/68 |

FOREIGN PATENTS OR APPLICATIONS

| | | | |
|---|---|---|---|
| 808,588 | 3/1969 | Canada | 99/66 |

Primary Examiner—Frank W. Lutter
Assistant Examiner—William L. Mentlik
Attorney—Richard C. Witte et al.

[57] ABSTRACT

Light-milled, cell-distorted roast and ground coffee wherein said light-milled coffee has a bulk density equal to that of conventional roast and ground coffee products. The product has some cell fracture and partial cell disruption and therefore has increased extractability. The light-milled, cell-distorted roast and ground coffee when viewed in bulk has the appearance of conventional roast and ground coffee but has from 10 to 30% increase in flavor strength. The method of producing this product comprises passing roast and ground coffee through a roll mill under controlled conditions of feed rate, pressure, and roll speed.

10 Claims, No Drawings

LIGHT-MILLED ROAST AND GROUND COFFEE

CROSS REFERENCE TO A RELATED APPLICATION

This application is a continuation-in-part of copending application Ser. No. 66,074, filed Aug. 21, 1970, now abandoned.

BACKGROUND OF THE INVENTION

As used herein, the term roast and ground coffee refers to a coffee product comprising conventionally prepared roast and ground coffee particles and also decaffeinated forms thereof. Such a product is composed of clearly defined cells providing a distinct structure defined by the individual cell walls. It does not include light-milled, cell-distorted roast and ground coffee referred to herein as "light-milled coffee;" nor does it include flaked roast and ground coffee. While light-milled coffee and flaked coffee are both produced by roll milling roast and ground coffee, the two products are to be distinguished. Light-milled coffee, as the name implies, is produced by generally using low roll mill pressures. From the cell structure point of view light-milled coffee has partial cell wall fracture, partial cell disruption and cells which have generally been flattened and compressed together to provide weakened and distorted but still definite cell structure. Flaked coffee, on the other hand, is produced by utilizing generally higher roll mill pressures to produce an easily definable flake shape which has nearly total cell disruption. In other words, speaking in general terms, light-milled coffee has weakened cell walls and partial cell disruption whereas flaked coffee has crushed cell walls and nearly total cell disruption. These differences can conveniently be seen when examining photomicrographs.

Flaked coffee per se is known in the art (see McKinnis, U. S. Pat. No. 1,903,362, Rosenthal, U. S. Pat. No. 2,123,207, and Carter, U. S. Pat. No 2,368,113). Light-milled roast and ground coffee which when viewed in bulk has the appearance and bulk density of conventional roast and ground coffee but has from 10% to 30% increase in flavor strength, has not heretofore been known in the art.

A copending commonly assigned application, Ser. No. 30,246, filed Apr. 20, 1970, now U. S. Pat. No. 3,615,667, of Joffe, entitled "FLAKED COFFEE AND PRODUCTS PRODUCED THEREFROM," relates to the flaking of roast and ground coffee as a means of advantageously controlling and regulating the flavor and aroma of coffee as well as the extractability of coffee. The Joffe patent discloses utilizing the varying effect of flaking on high, low, and intermediate grade coffees, as a method of making an improved roast coffee product comprising as a major portion low and/or intermediate grade coffee flakes, and as a minor portion, high grade roast and ground coffee. An additional copending application of McSwiggin et al. entitled "A METHOD OF MAKING FLAKED ROAST AND GROUND COFFEE," Ser. No. 823,942, filed May 12, 1969 now U. S. Pat. No. 3,660,106, discloses preferred conditions for making flaked roast and ground coffee.

The flaked coffee product and processes disclosed in the above identified applications are excellent products from the standpoint of versatility and consumer acceptance. However, it is often of an advantage to provide a series of products each having its own distinctive characteristics. Moreover, for those people who have become familiar with conventional roast and ground coffee, it is at times of a definite advantage to provide a product having that same appearance. Light-milled roast and ground coffee has the bulk appearance of conventional roast and ground coffee and, surprisingly, the same bulk density, and yet has from 10 percent to 30 percent increase in flavor strength over and above conventional roast and ground coffee. It should be noted that light-milled coffee is characterized as having the "bulk appearance" of roast and ground coffee. While individual particles may by pure chance have the geometric shape of a flake, they all differ from flakes in cell characterization and extractability characteristics and when viewed in bulk give a visual impression distinct from flakes and very much like roast and ground coffee.

It is an object of this invention to provide light-milled roast and ground coffee which has the bulk appearance of conventional roast and ground coffee particles, the same bulk density as conventional roast and ground coffee particles, and yet which is from 10 percent to 30 percent greater in flavor strength than conventional roast and ground coffee.

SUMMARY OF THE INVENTION

This invention relates to light-milled, roast and ground coffee which has the same bulk appearance as conventional roast and ground coffee particles as well as the same bulk density as conventional roast and ground coffee particles but which has from 10 percent to 30 percent increase in flavor strength over and above conventional roast and ground coffee products. The invention also relates to a method of making light-milled roast and ground coffee comprising passing roast and ground coffee through a roll mill within a range of carefully defined coffee feed rates, roll mill pressures, and roll peripheral surface speeds.

DETAILED DESCRIPTION OF THE INVENTION

In forming light-milled roast and ground coffee, roast and ground coffee is subjected to mechanical pressure by passing conventional roast and ground coffee particles through two parallel smooth or highly polished rolls so that the coffee particles passing between the rolls are subjected to sufficient stress in order to provide the previously described cell distortion, i.e., partial cell fracture, partial cell disruption, some cell flattening and compression and generally a weakened and distorted but still definite cell structure.

In roll milling roast and ground coffee to produce light-milled coffee, it has been found important to control several process variables besides pressure. These additional variables which are essential to control within hereinafter-defined ranges include roast and ground coffee feed rate to the mill and roll peripheral surface speed. Other variables of less importance from the standpoint of producing a light-milled coffee but still important from an overall efficiency standpoint include mill diameter, coffee moisture content and particle size, and roll surface temperature.

The three most important factors which must be controlled in producing light-milled, cell-fractured roast and ground coffee are the roll pressure, the roast and ground coffee feed rate, and roll peripheral surface speed. Roll pressure is measured in pounds/inch of nip.

Nip is a term used in the art to define the length of surface contact between two rolls when the rolls are at rest. To illustrate, it can be thought of as a line extending the full length of the rolls and defining the point of contact between two rolls. Feed rate as used herein is defined as the pounds of roast and ground coffee per hour passing through each inch of nip. The third variable, roll peripheral surface speed, is measured in feet/minute of surface circumference which passes by the nip. Generally, higher peripheral speeds mean that pressures within the lower portion of the hereinafter described ranges can be employed to produce satisfactory light-milled coffee of the requisite bulk density. Conversely, at lower peripheral speeds pressures at or near the higher end of the hereinafter described ranges must be employed to produce light-milled coffee of the requisite bulk density.

In further regard to roll peripheral surface speeds, it should be mentioned that it is preferred that the individual rolls of the roller mill be operated at the same speeds. Differential roll speeds, however, can be utilized. If differential roll speeds are utilized, roll speed ratios in excess of 1.5:1 are not desirable. Preferably, when differential roll speeds are employed the roll speed rate is within the range of 1:1 to 1.4:1.

It is to be understood that the three important variables of pressure, roll speed and feed rate are all interrelated and act in a combined manner to produce light-milled coffee. Thus, within a given range for a single variable manipulation within a corresponding range must occur for the other two variables in order to insure preparation of light-milled coffee rather than flakes. For example, as feed rate is increased the pressure and roll speed must also be inceased to continue production of light-milled coffee as that product is defined herein.

Because the relationship of the important variables includes three determinations, i.e., pressure, roll speed and feed rate, it cannot adequately be presented on two-dimensional graphic illustration. Moreover, because the interdependence of these three variables in producing light-milled coffee is not a linear relationship but rather a curved line relationship, they cannot be expressed as absolute ranges, the entire scope of which will produce light-milled coffee. Of course, this non-straight line relationship and non-planar (three-dimensional as opposed to two-dimensional) relationship makes definition difficult. However, by experimentation it has been found that the relationships shown in the following Table will produce the desired light-milled product. The three sets of relationships presented in the Table below represent an experimental integration of a plurality of data points.

TABLE

| Set No. | Pressure, lbs./in. | Roll speed, ft./min. | Feed rate, lbs./hr./in. |
| --- | --- | --- | --- |
| 1 | 750–1400 | 200–350 | 100–275 |
| 2 | 850–1700 | 350–600 | 275–400 |
| 3 | 1000–2000 | 600–750 | 400–550 |

The important factor to remember is that within each given set of conditions, operation at points within the expressed ranges wil produce light-milled coffee. The overlap of ranges occurs because of the non-linear and non-planar relationship that exists. For example, at a roll pressure of 2,000 lbs./inch of nip and a roll speed of 700 ft./min., a .012 inch thickness flake will be produced at a feed rate of 100 lbs./hr./inch, a .020 inch thickness flake will be produced at a feed rate of 300 lbs./hr./inch and light-milled coffee will be produced at a feed rate of 550 lbs./hr./inch. In like manner, at a roll speed of 700 ft./min. and a feed rate of 445 lbs./hr./inch, a 0.27 inch thickness flake will be produced at a pressure of 2,200 lbs./inch of nip; light-milled coffee will be produced at 1,400 lbs./inch of nip; and at a pressure of 660 lbs./inch of nip roast and ground coffee passing through the mill will remain unchanged in terms of cell characterization. Thus, as can be seen from the above specific examples only conditions of pressure, roll peripheral surface speed and coffee feed rate falling wholly within a single one of the above sets specified in the Table, as opposed to falling within the entire range of conditions expressed amongst all three sets, will assure preparation of light-milled coffee. Put still another way, where pressure, roll speed and feed rate fall wholly within set No. 3 of conditions, light-milled coffee will result, but where both pressure and roll speed fall within the ranges for set No. 3 conditions and the feed rate falls within set No. 1 conditions, the result may be a flake (see the first example given in this paragraph).

It should be understood that as roll speed is increased beyond 750 ft./min., if pressure is increased beyond 2,000 lbs./inch and feed rate is increased beyond 550 lbs./hr./inch, some light-milled coffee may be formed. Likewise, as pressure is reduced below 750 lbs./inch and roll speed is reduced below 200 ft./min. and feed rate is reduced below 100 lbs./hr./inch, some light-milled coffee may be produced. However, such conditions are not practical because of the resulting low capacities.

Roll surface temperature, as used herein, is measured in degrees Fahrenheit, and refers to the average surface temperature of the rolls. Control of the roll mill surface temperature is accomplished by controlling the temperature of a heat exchange fluid passing through the inner core of the rolls. Generally, the fluid, which is most often water, is heated or cooled and passed through the inside of the rolls. The result is that the roll surface, which is usually a smooth, highly polished steel surface, is subjected to temperature control by means of heat transfer. Of course, in actual operation the surface temperature will not be exactly the same as the temperature of the heat exchange fluid, and will be somewhat higher because milling of coffee particles to produce light-milled coffee tends to increase the roll surface temperature. Accordingly, the required heat exchange fluid temperature to maintain any specific roll surface temperature depends upon several factors, such as the kind of metal the roll surfaces are made of, the speed of operation of the roll mills, and the heat exchange fluid employed.

Generally, it can be stated that higher roll surface temperatures tend to increase the propensity for flavor degradation of the light-milled, roast and ground coffee, and therefore should be avoided. On the other hand, lower roll surface temperatures can be employed without disadvantages. However, no particular advantage is gained in utilizing temperatures below room temperatures so that a cooling medium must be employed. Generally, satisfactory light-milled coffee can be produced wherein the roll surface temperature is within the range of from 50° to 200° F. Temperatures less than 50° F are undesirable because cooling systems must be employed and the resulting product tends to be quite brittle and easily fractured to produce large quantities of coffee fines which are undesirable because they result in a change in product bulk density. Temperatures above 200° F should be avoided because at temperatures elevated above 200° F noticeable degradation of coffee flavor occurs. To produce light-milled coffee having a bulk density which is essentially the same as that of roast and ground coffee without noticeable flavor degradation, it is preferred that the roll mill surface temperature be within the range of 90° to 180° F. When roll surface temperatures are within this range the majority of the resultant cell-fractured, light-milled coffee is of a proper structural integrity to insure a bulk density near that of roast and ground coffee coupled with a product which exhibits little or no flavor degradation.

The bulk density of roast and ground coffee is generally within the range of from .38 g/cc to .50 g/cc, and most often within the preferred range of from 0.42 g/cc to 0.48 g/cc. Such bulk densities are generally those of conventionally prepared roast and ground coffees of regular, drip, and fine grinds. If the light-milled product bulk density varies from this range and is, for example, higher, the consumer would need to use substantially less than usual quantities of coffee to produce a brew of given strength. This required adjustment in consumer habits might be met with difficulty, and therefore careful attention is given to producing product having a bulk density similar to that of roast and ground coffee so that familiar measurement techniques can still be employed. Using the process conditions specified herein gives a product having the bulk density of roast and ground coffee.

In producing light-milled roast and ground coffee, the light-milled, cell-fractured coffee product moisture content preferably should be from 2.5 to 7.0 percent by weight, with from 3.0 to 6.0 percent being most preferred. Consequently, the moisture content of the conventional roast and ground coffee particles which are utilized to prepare light-milled coffee preferably should be within the range of from 2.5 to 7.0%. At moisture contents less than 2.5% the conventional roast and ground coffee is often too dry to produce light-milled coffee, and may have a tendency to grind into fines rather than become light-milled. On the other hand, moisture contents above 7.0% preferably are to be avoided because the staling propensity of the resulting light-milled coffee is substantially increased at such high moisture contents. Providing a moisture content of the conventional roast and ground coffee to be light-milled within the range of from 3.0 to 6.0% provides the highest yield of light-milled coffee coupled with little or no flavor degradation, and is most therefore preferred.

In regard to the particle size of the conventional roast and ground coffee employed in producing the light-milled product of this invention, no criticality exists. However, from the standpoint of producing products of a bulk density similar to that of conventional roast and ground coffee, it is preferred that the roast and ground coffee particles be of conventional size distributions; that is, have a particle size of from 0.0 to 18.0% retained on a 12 mesh U.S. Standard Screen, from 0.0 to 46.0% retained on a 16 mesh U.S. Standard Screen, from 15.0 to 50.0% retained on a 20 mesh U.S. Standard Screen, from 7.0 to 30.030.0% retained on a 30 mesh U.S. Standard Screen, from 4.0 to 15.0% retained on a 40 mesh U.S. Standard Screen, and from 3.0 to 8.0% passing through a 40 mesh U.S. Standard Screen. Speaking in more familiar terms, the roast and ground coffee to be light milled can be "regular", "drip" or "fine" grind as these terms are used in a traditional sense. The standards of these grinds as suggested in the 1948 Simplified Practice Recommendation by the U.S. Department of Commerce (see Coffee Brewing Workshop Manual, page 33, published by the Coffee Brewing Center of the Pan American Bureau are as follows: "Regular grind", 33% is retained on a 14 mesh Tyler Standard Sieve, 55% is retained on a 28 mesh Tyler Standard Sieve and 12% passes through a 28 mesh Tyler Standard Sieve; "drip grind", 7% is retained on a 14 mesh Tyler Standard Screen, 73% on a 28 mesh Tyler Standard Sieve and 20% passes through a 28 mesh Tyler Standard Sieve; and "fine grind" 100% passes through a 14 mesh Tyler Standard Sieve, 70% being retained on a 28 mesh Tyler Standard Sieve and 30% passing through a 28 mesh Tyler Standard Sieve. Of the above mentioned traditional grind sizes, the most preferred is "regular grind."

In further regard to particle size, it has previously been mentioned that the light-milled, cell-fractured coffee product of this invention has a bulk density substantially similar to that of conventional roast and ground coffee. In other words, it is important to remember that the light milling process of this invention does not involve bulk density change but merely changes the individual cell characteristics. The input of conventional roast and ground coffee particles has the same bulk density as the output of light-milled coffee, the only difference being that the output, despite the fact that it has the overall appearance of roast and ground coffee, has been cell distorted as that term is used herein. The distortion that occurs results in from 20 to 65% of the cells being at least partially disrupted and therefore extractability of the product is increased.

The diameter of the roll mills employed controls the angle of entry into the nip. Angle of entry into the nip in turn has a direct effect on the particle size of the coffee that will pass through the nip, and consequently on the bulk density of the resultant light-milled coffee. To produce the hereinbefore described light-milled coffee, with the requisite bulk density which is within the range of bulk densities for roast and ground coffee, it is preferred that the roll diameter be within the range of 6 inches to 30 inches with from 9 inches to 25 inches being most preferred. If rolls having a diameter of less than 6 inches are utilized the roast and ground coffee particles with a normal particle size distribution as hereinbefore described often tend to churn on the mill surfaces and not pass through the nip; consequently, the throughput rate of the conventional roast and ground coffee employed to produce light-milled coffee is so slow as to be impractical. Roll mills having roll diameters greater than 30 inches are not readily available.

As can be seen from the foregoing description, the ranges of each of the described milling process variables are closely tied to and correlated with each of the other processing variables. A change in one variable often has a direct effect in changing another variable.

The following examples are offered to further illustrate but not limit the invention disclosed herein.

EXAMPLE 1

400 pounds of a blend comprising 25% high quality Arabicas, 43.75% Brazils, 6.25% low quality Arabicas, and 25% Robustas is roasted in a Thermolo roaster at air temperatures within the range of from 400° to 550° F. The end roast temperature is 430° F. The total roast time is 16 minutes, and the roast was quenched with 7 gallons of water. The blend was ground to regular grind size in a Gump pilot grinder, and the moisture level was measured as 4.24% by weight. The conventional roast and ground coffee particles bulk density was measured and found to be 0.451 grams/cc. Bulk density as used herein refers to the tamped bulk density and refers to the overall density of a plurality of particles measured after vibratory settlement in a manner such as that described on pages 130-1 of Sivetz, Coffee Processing Technology, Avi Publishing Co., Westport, Conn., 1963, Vol. 2. The conventional regular grind roast and ground coffee particles are used to prepare light-milled roast and ground coffee in the following manner. The coffee is fed at a rate of 180 lbs./hr./inch of nip into a Lehman 2-roll mill. The roll mill is further characterized by having rolls of a 13-inch diameter and 32 inches long. The roll pressure is 1000 pounds/inch of nip. The roll surface temperature is 140° F, and the roll peripheral surface speed of each of the rolls is 200 feet/minute. The amount of nip actually utilized during the runs of this and the following examples is only 7 inches. The conditions of pressure, roll speed and feed rate fall within set No. 1 conditions as expressed in the Table.

The resulting product is examined and found to have a moisture content of 4.0% and a bulk density of 0.44 grams/cc, indicating a bulk density substantially identical to that of the feed conventional roast and ground coffee particles. Visual examination of the product reveals that in appearance it is identical with conventional roast and ground coffee particles. However, microscopic examination reveals that a substantial portion of cells, i.e., greater than 20%, are at least partially disrupted. The coffee cells are noted to be distorted from their normal appearance and in particular are noted to be compressed, often cell wall fractured, flattened, and generally weakened in structural integrity.

A panel of four expert tasters prepares cups of coffee from the light-milled coffee in the following manner: The amount of light-milled coffee used is 7.2 grams/cup; the amount of water per cup is 178 ml; the coffee is placed in a conventional percolator and allowed to perk until the temperature reaches 180° F, at which time the coffee beverage is poured into cups to be tasted by the expert panel. The panel compares the taste of the coffee brewed from the hereinabove described light-milled coffee with coffee beverage prepared from regular grind Folger roast and ground coffee. The experts note that the beverage produced from the light-milled coffee is about 15% stronger in taste impact than the coffee brewed from the standard roast and ground coffee.

EXAMPLE 2

The process of Example 1 utilizing the roast ground coffee blend of Example 1 is repeated with the following changes: the nip pressure is 1,000 pounds/inch of nip; the feed rate to the mill is 300 pounds/hour/inch; the tamped density of the product is .44 grams/cc; and the roll peripheral surface speed is 500 feet/minute. The product has the bulk visual appearance of roast and ground coffee and, when tasted by an expert panel in the manner previously described in connection with Example 1, shows an average of 20% increase in flavor strength over the flavor strength of the roast and ground coffee.

EXAMPLE 3

Example 1 is repeated with the following changes: The roll pressure is 1,500 pounds/inch of nip; the feed rate is 500 pounds/hour; the roll speed is 750 feet/minute; the roll surface temperature is 98° F; the product bulk density is 0.44 g/cc. Visual examination of the product reveals that it looks exactly like conventional roast and ground coffee. Tasting by an expert panel as described in Example 1 reveals that the product is about 25% on an average, stronger in taste than coffee brewed from a standard roast and ground coffee product of regular grind size.

What is claimed is:

1. A light-milled roast and ground coffee having a bulk appearance and density like that of roast and ground coffee but providing from about 10% to about 30% increased flavor strength over an equivalent amount of roast and ground coffee; said light-milled roast and ground coffee obtained by a process comprising passing roast and ground coffee through a roll mill under one of a three-variable set of mutually exclusive processing conditions; said mutually exclusive processing sets comprising: a roll pressure of from 750 pounds/inch of nip to 1,400 pounds/inch of nip, at a roll peripheral surface speed of from 200 feet/minute to 350 feet/minute, and at a roast and ground coffee feed rate to the mill of from 100 pounds/hour per inch of nip to 275 pounds/hour per inch of nip; a roll pressure of from 850 pounds/inch of nip to 1,700 pounds/inch of nip, at a roll peripheral surface speed of from 350 feet/minute to 600 feet/minute at a roast and ground coffee feed rate to the mill of from 275 pounds/hour per inch of nip to 400 pounds/hour per inch of nip; a roll pressure of from 1,000 pounds/inch of nip to 2,000 pounds/inch of nip at a roll peripheral surface speed of from 600 feet/minute to 750 feet/minute at a roast and ground coffee feed rate to the mill of from 400 pounds/hour per inch of nip to 500 pounds/hour per inch of nip, respectively.

2. A method of making light milled roast and ground coffee which has a bulk appearance of conventional roast and ground coffee particles and which has 10 to 30% increase in flavor strength over an equivalent amount of conventional roast and ground coffee particles, said process comprising passing roast and ground coffee through a roll mill at a roll pressure of from 750 pounds/inch of nip to 1,400 pounds/inch of nip, at a roll peripheral surface speed of from 200 feet/minute to 350 feet/minute and at a roast and ground coffee feed rate to the mill of from 100 pounds/hour per inch of nip to 275 pounds/hour per inch of nip.

3. The process of claim 2 wherein the roll mill surface temperature is from 50° to 200°F.

4. The process of claim 3 wherein the roll surface temperature is from 90° to 180°F.

5. A method of making light milled roast and ground coffee which has a bulk appearance of conventional roast and ground coffee particles and which has 10 to 30% increase in flavor strength over an equivalent amount of conventional roast and ground coffee particles, said process comprising passing roast and ground coffee through a roll mill at a roll pressure of from 850 pounds/inch of nip to 1,700 pounds/inch of nip, at a roll peripheral surface speed of from 350 feet/minute to 600 feet/minute and at a roast and ground coffee feed rate to the mill of from 275 pounds/hour per inch of nip to 400 pounds/hour per inch of nip.

6. The process of claim 5 wherein the roll mill surface temperature is from 50° to 200° F.

7. The process of claim 6 wherein the roll surface temperature is from 90° to 180° F.

8. A method of making light milled roast and ground coffee which has a bulk appearance of conventional roast and ground coffee particles and which has 10 to 30% increase in flavor strength over an equivalent amount of conventional roast and ground coffee particles, said process comprising passing roast and ground coffee through a roll mill at a roll pressure of from 1,000 pounds/inch of nip to 2,000 pounds/inch of nip, at a roll peripheral surface speed of from 600 feet/minute to 750 feet/minute and at a roast and ground coffee feed rate to the mill of from 400 pounds/hour per inch of nip to 550 pounds/hour per inch of nip.

9. The process of claim 8 wherein the roll mill surface temperature is from 50° to 200° F.

10. The process of claim 9 wherein the roll surface temperature is from 90° to 180° F.

* * * * *